Patented Oct. 15, 1929

1,731,677

UNITED STATES PATENT OFFICE

ROBERT GRAHAM MEWBORNE, OF ALBUQUERQUE, NEW MEXICO, ASSIGNOR TO CONSUMERS TOBACCO COMPANY, OF ALBUQUERQUE, NEW MEXICO, A CORPORATION OF DELAWARE

INSECTICIDE AND PROCESS OF MAKING THE SAME

No Drawing. Application filed October 6, 1925, Serial No. 60,738. Renewed January 13, 1928.

This invention relates to insecticides and processes of manufacturing the same. The invention generally relates to a nicotine product useful as an insecticide making utility of the contacting or fumigating toxicity of such alkaloid contents as well as that due to ingestion, and further resides in a new process of preparing such product. I have found that nicotine in its free state or free base nicotine, that is, nicotine uncombined with acids is highly efficient as a fumigant or contacting poison, and when present in finely divided condition or as in a powder, efficiently serves the multiple purpose of a poison by contacting and fumigating.

As hitherto practiced, nicotine has found its way as a constituent in insecticides by the circuitous method of liberating, extracting or otherwise preparing a high nicotine content material and using this product in further admixture with other ingredients. Aside from the costliness of the process of thus obtaining nicotine, and the loss in efficiency as an insecticide of the product thus obtained, there are the attendant losses due to inefficient separation of the alkaloid from its original state in the tobacco plant.

The method employed to liberate the nicotine content from tobacco which has found recognition, involves the treatment of the tobacco under alkaline conditions and then in this condition separating the nicotine by some form of distillation, either wet or dry, and concentration or otherwise recovering the liberated nicotine in some form of suitable product for use for any purpose in which nicotine may be desirable.

Insecticides, either pastes, solutions or dusts containing this nicotine in the form resulting from the recovery process above outlined, aside from the objection due to high cost, are further highly inefficient as fumigants, as the product containing the nicotine is of such dilution and of such stability as to be inefficient as a fumigant.

Attempt to utilize tobacco dust has been found to be equally inefficient as a contacting and fumigating insecticide because of the nicotine being contained therein in combined form, and of such concentration as to be ineffective for purposes of ingestion, and its use has always been accompanied by an enriching process which, in addition to being expensive, required the incorporation therein of a combined form of nicotine products, or enrichment by free nicotine.

My invention has for its object the provision of a product containing nicotine obtained from tobacco products and useful directly as an insecticide; the provision of a product containing nicotine including the elements of the tobacco plant but having its nicotine content as an active ingredient suitable as a fumigant; the provision of a product containing nicotine having utility as a dusting powder having its nicotine content available as a contacting and fumigating poison without separation of the original nicotine content; the provision of a dusting insecticide made from tobacco and having a high content of free nicotine; the provision of a dusting insecticide made by treating tobacco material with an alkali; the provision of a dusting insecticide made by dehydrating tobacco material; the provision of a dusting insecticide made by absorbing the water content of tobacco material without loss of the nicotine content and containing free nicotine; the provision of a dusting insecticide made from tobacco and having free nicotine as contained in tobacco commingled with an inert carrier; the provision of a dusting insecticide made by chemically dehydrating tobacco material; the provision of a dusting insecticide made by freeing the combined nicotine content of the tobacco material while combining the ingredients with the agent used for freeing the nicotine content; the provision of a dusting insecticide made by treating tobacco material with an absorbent; the provision of a dusting insecticide made by treating tobacco material with an alkali in the presence of moisture and producing a pulverulent material; the provision of a dusting insecticide made by treating tobacco material with an alkali in the presence of moisture and then rendering the product devoid of plasticity due to any uncombined water; the provision of a dusting insecticide comprising the original tobacco material containing uncombined nicotine therein without any addition from a source other than that contained in the original tobacco; the provision of a dusting insecticide made from tobacco material comprising an inert carrier and uncombined nicotine disseminated therethrough.

My invention further has for its object the provision of a process for making a finely divided material containing nicotine without the use of extraneous heat, but merely by liberating the nicotine content; the provision of a process for making a finely divided material suitable as a contacting and fumigating poison by liberating free base nicotine within a mixture containing tobacco; the provision of a process for making an insecticide which comprises treating tobacco and chemically combining its water content; the provision of a process for making an insecticide which comprises treating tobacco to chemically combine its water content and liberate free base nicotine; the provision of a process for making an insecticide which comprises treating tobacco to simultaneously liberate the nicotine and recover a pulverulent material; the provision of a process of making an insecticide which includes dehydrating tobacco, recovering a pulverulent material including the original nicotine content of the tobacco in uncombined form; the provision of a process for making an insecticide from tobacco which comprises liberating free nicotine and directly recovering a dry pulverulent material; the provision of a process for making an insecticide which includes the liberation of an active or free base nicotine without separation from the original source and directly recovering an insecticide suitable for dusting purposes.

My invention further has for its object the provision of a process for making a dusting insecticide without the use of expensive apparatus either for generation of nicotine from the free tobacco or the recovery thereof by use of condensers, absorbents and the like, and producing a product which has a nicotine content sufficiently high to be suitable directly for a content and fumigating insecticide.

Other objects and advantages of my invention will be apparent or be pointed out as the description of my invention proceeds.

In the production of a nicotine dust made in accordance with my invention, tobacco material, either leaf tobacco, tobacco dust, stalk, seed, root, stems of any kind of the tobacco plant, is directly processed to the finished product suitable for use as an insecticide by dehydrating or separating the water content and simultaneously liberating the free base nicotine contained therein, so that the nicotine normally present is made available as a fumigant.

For purposes of illustration, I have found that I may react with a tobacco material a chemical or physical absorbent for water to directly produce a material suitable as a dusting insecticide. I may accomplish this dehydration by materials such as quicklime, hydrated lime, burnt dolomite or other materials which physically or chemically combine with water. For instance, I may also use a material which has the characteristic of absorbing water such as bentonite.

In the practice of my invention, I preferably finely grind my tobacco material with any one of the chemicals above enumerated. However I have found that by intimately grinding burnt lime with tobacco material, that the withdrawal of the moisture content of the tobacco is effected, at the same time liberating in the admixture free base nicotine.

For further purposes of illustration, I have taken tobacco having a content of 9% nicotine, 100 pounds of which are combined or mixed with 20 pounds quicklime and 20 pounds water. These ingredients are intimately combined preferably in a closed container. The product thus obtained may be further dried to take up any uncombined moisture and reduce the admixture to a pulverulent condition. This, I may accomplish by vacuum drying or otherwise dehydrating the excess water without substantial loss of the volatile nicotine constituent. Preferably, however, I add an additional amount of an absorbent which may be a further quantity of quicklime. However, such absorbents as kieselguhr, dolomite, bentomite or any other carrier may be added.

The effect produced is to further reduce the matters to a condition suitable as a dusting insecticide and reducing the plasticity or lump forming quality, were an excess amount of water present.

To produce a 2% free nicotine dust, I may mix with a tobacco material 25 lbs. tobacco containing 8% nicotine with a solution containing about 3 lbs. sodium hydrate and 5 lbs. water. This mixture may be directly dried and produce a nicotine dust. Preferably, however, instead of drying or dehydrating, I add 15 to 20 lbs. of quicklime and subsequently add 52 to 47 lbs. of an absorbent such as bentonite, kieselguhr, dolomite or an additional amount of quicklime; or if desired, finely divided hydrated lime.

Whereas my process above outlined is suitable for all tobacco products, I have found it to be particularly suitable for operation in connection with tobacco products having a low content of nicotine. However, in certain cases my process may be practised in a highly simplified form in connection with a nicotine content of upwardly 6 to 10%. Tobacco product of such content may be directly processed to a nicotine dust by intimately grinding a dehydrating agent with the raw material. And I have found that the grinding action, for instance where quicklime is used, simultaneously serves to produce an intimate admixture of nicotine containing material disseminated therethrough, and having the nicotine content in uncombined form.

It will be observed that my process takes advantage of the effect of alkalis upon tobacco materials serving to liberate nicotine therefrom to render the nicotine content active as distinguished from its prior condition when combined with the acid content in the cellular structure of the plant and then directly reducing the same to a product marketable as a dusting insecticide, avoiding the hitherto practised steps of separating the nicotine from the other constituents of the tobacco and then again recovering it for addition to other materials or chemically combining or otherwise rendering the same suitable for use.

It will be observed in the practice of my process as above outlined, wherein the absorbent is intimately admixed and commingled with the tobacco product that is used, that a certain amount of heat may be involved by reason of the reaction causing a liberation at this stage of the operation or at a subsequent stage by a further addition of an alkali or an absorbent which in reaction with any moisture present will further liberate nicotine, that there is produced an atmosphere charged to some extent with free nicotine. In connection with this step, I may therefore add in the mixing apparatus which is preferably a closed chamber, a certain amount of an absorbent upon the particles of which will condense or otherwise take up the nicotine thus suspended in the atmosphere of the apparatus. Preferably, I employ absorbents such as charcoal, either activated or otherwise or a mineral absorbent such as silica-gel or other absorbents which have the property of condensing vapors upon their surfaces or within the pores thereof.

It will also be understood that in the operation of my process, the added chemicals or absorbents are maintained in contact with each other for a time which will substantially, completely liberate the nicotine content thereof not only for the purpose of making the nicotine content of the tobacco active, but for the purpose of producing a material suitable for dusting purposes by the loss of free water which will prevent proper dusting qualities.

It will be understood that this reaction period will vary with the nature of the tobacco used, both as to its nicotine content and as to the amount of its other constituents such as moisture, organic or cellular construction or the like.

Having thus described my invention and illustrated its use, what I claim as new and desire to cover by Letters Patent is:

1. The herein described process which comprises admixing tobacco with a dehydrating agent and pulverizing the mixture to produce a dusting powder, holding the original nicotine content substantially free.

2. The herein described process which comprises admixing tobacco with an alkaline agent and pulverizing the mixture to produce a dusting powder holding the original nicotine content substantially free.

3. The herein described process of making an insecticide which comprises dehydrating in situ, the water content of tobacco and recovering a pulverulent material including substantially the original tobacco constituents and free nicotine.

4. The herein described process of making an insecticide which comprises dehydrating in situ, the water content of tobacco by means of an absorbent and recovering a pulverulent material including substantially the original tobacco constituents and free nicotine.

5. The process of making an insecticide which comprises treating tobacco in the presence of an alkali while absorbing the water content to an extent whereby a pulverulent material is obtained.

6. In the process of treating products containing tobacco, the step which comprises liberating free nicotine without substantial loss thereof, in situ and reducing the mixture containing the same to a dry pulverulent condition.

7. In the process of making a dusting insecticide, the steps which comprise treating tobacco containing combined nicotine with an alkali in the presence of water and dehydrating to remove the excess water while maintaining conditions to prevent the loss of nicotine.

8. The process of making a dusting insecticide which comprises treating tobacco with an alkali in the presence of water and dehydrating the mixture by the addition of an absorbent and holding substantially the original nicotine content free.

9. The process of making a dusting insecticide which comprises treating tobacco with lime in the presence of water and rendering the resultant product pulverulent by dehydrating the same and holding substantially the original nicotine content free.

10. The process of making a dusting insecticide which comprises treating tobacco with lime in the presence of water and rendering the resultant product pulverulent by dehydrating the same by the addition of an absorbent and holding substantially the original nicotine content free.

11. The process of making a dusting insecticide which comprises treating tobacco with quick lime in the presence of water and rendering the resultant product pulverulent by an additional amount of quick lime, the whole being accomplished while retaining substantially the entire nicotine content.

12. A dusting insecticide comprising tobacco having its original nicotine content of about 5% and up to 10% freed by dehydration of the water component and held free in situ by an absorbent.

13. A dusting insecticide including tobacco material, an alkali and water, the nicotine content of the tobacco having been displaced and retained substantially free in situ.

14. A dusting insecticide powder comprising tobacco material and finely comminuted mineral matter, said tobacco having its nicotine content in uncombined form and disseminated through the mineral matter.

15. In the process of making a dusting insecticide, the steps which comprise interacting tobacco material with an agent capable of liberating the nicotine content thereof to partially form nicotine in the vapor phase and adding an absorbent whereby the nicotine in the vapor phase is absorbed and commingled with the first added ingredients.

16. The process of making a dusting insecticide which comprises intimately mixing an alkali with tobacco material in the presence of moisture to liberate free nicotine in the liquid and vapor phase and adding an absorbent whereby the nicotine so vaporized is combined with the first added ingredients.

17. In the process of making a dusting insecticide, the step which comprises agitating tobacco in the presence of a caustic alkali and drying to preserve substantially the original nicotine content in the mixture.

18. A dry composition of matter comprising tobacco material and substantially the original nicotine content thereof, the nicotine being present as free nicotine.

19. The process of making an insecticide which comprises treating the tobacco with an agent capable of combining with the water content and in amounts to produce a combined pulverulent powder and interacting therewith to hold substantially the original nicotine content free in situ.

20. The process of making an insecticide which comprises treating tobacco with an agent capable of combining with the water content while maintaining alkaline conditions and producing a pulverulent powder and holding the original nicotine content free in situ.

21. An insecticide powder comprising the reaction product of tobacco and an alkali in the presence of moisture and devoid of plasticity of uncombined water and an intermixed absorbent and containing substantially the entire tobacco constituents.

22. An insecticide comprising tobacco including the cellular structure thereof substantially free of combined nicotine and containing substantially the original nicotine content in situ.

23. The process of making an insecticide from tobacco material which comprises adding an aqueous solution of an alkaline agent to the tobacco in pulverized form, to obtain a pulverized mixture and an aqueous interaction with the original nicotine held substantially free.

In witness whereof, I have signed this specification, this third day of October, 1925.

ROBERT GRAHAM MEWBORNE.